United States Patent [19]

Dayton

[11] Patent Number: 4,792,039

[45] Date of Patent: Dec. 20, 1988

[54] CARRIER FOR STORING AND TRANSPORTING A BICYCLE

[76] Inventor: Lynford Dayton, P.O. Box 24, Terryville, Conn. 06787

[21] Appl. No.: 48,426

[22] Filed: May 11, 1987

[51] Int. Cl.$^4$ .............................................. B65D 85/68
[52] U.S. Cl. ................................... 206/304; 206/335; 220/337; 217/37
[58] Field of Search ............... 206/335, 304, 320, 349; 217/37, 38; 150/52 R, 52 K; 190/111, 112; 220/337

[56] References Cited

U.S. PATENT DOCUMENTS

| | | | |
|---|---|---|---|
| 2,273,544 | 2/1942 | Vandervort | 206/335 X |
| 3,317,076 | 5/1967 | Enders | 220/337 |
| 3,848,784 | 11/1974 | Shimano et al. | 217/37 X |
| 3,886,988 | 6/1975 | Garrett et al. | 206/335 X |
| 4,149,634 | 4/1979 | Lewis, Jr. et al. | 206/335 |
| 4,353,464 | 10/1982 | Bentler | 206/335 |
| 4,390,088 | 6/1983 | Brenner | 206/335 |

*Primary Examiner*—Stephen Marcus
*Assistant Examiner*—Tracy G. Graveline
*Attorney, Agent, or Firm*—Beveridge, DeGrandi & Weilacher

[57] ABSTRACT

A carrier for storing and/or transporting a partially disassembled bicycle is disclosed as including a rigid base section and rigid left and right side sections. Quick-release hinge devices detachably and pivotably connect each of the side sections to the base section. A mounting assembly detachably mounts an upright bicycle frame on the base section. Releasable devices are also provided for mounting the bicycle wheels on either of the two side sections.

13 Claims, 2 Drawing Sheets

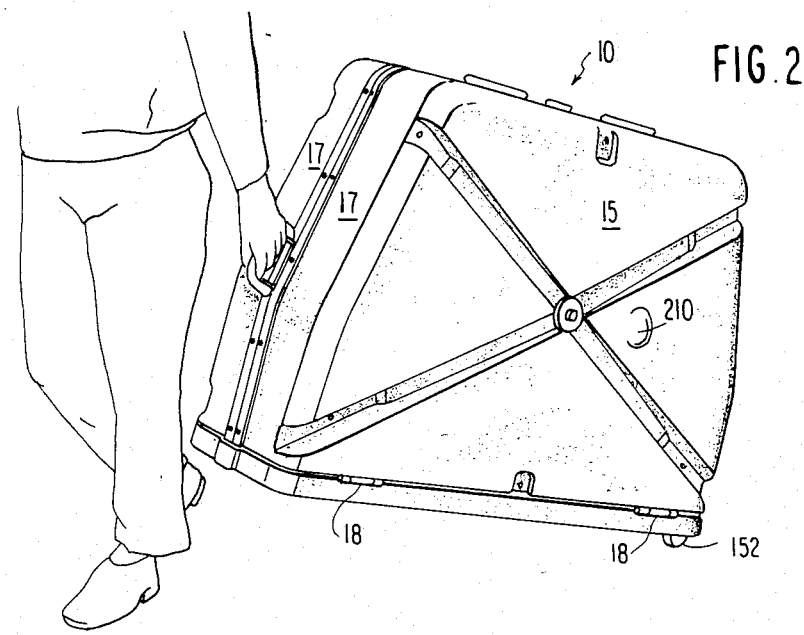
FIG. 2
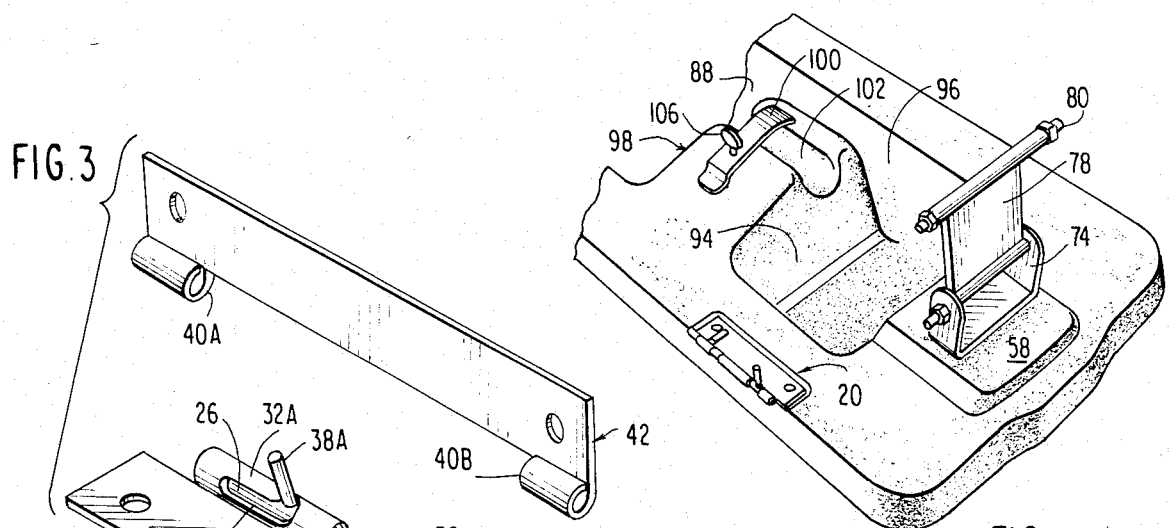
FIG. 3
FIG. 5
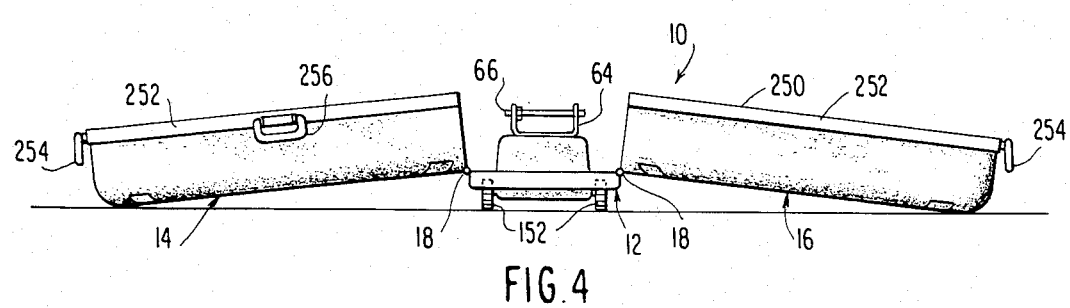
FIG. 4

CARRIER FOR STORING AND TRANSPORTING A BICYCLE

BACKGROUND OF THE INVENTION

The present invention pertains to a carrier for storing or conveniently transporting a partially disassembled bicycle. More particularly, the invention relates to a carrier having a rigid base section which accommodates the frames of all standard racing and touring bicycles and two side sections which are detachably and pivotably connectable to the base section.

Competitive bicycling has become increasingly popular in recent years. It has become even more popular with the increasing interest in triathlon contests. Such competitive cycling requires expensive light-weight bicycles intended for long distance riding. The bicycles are constructed from very light metals and include precision machine parts such as multi-speed derailer mechanisms. These bicycles frequently must be transported by airplane, train or automobile to the location where the competition or touring is to take place. The bicycle is then reassembled prior to the competition.

As discussed in U.S. Pat. No. 4,353,464, where the weight of modern bicycles is reduced and precision machining increased, the resulting bicycle becomes more fragile and susceptible to damage from abusive handling. Light-weight wheels and rims are prone to bending while derailer mechanisms are susceptible to misalignment. Such bicycles require great care in their storage and transport to avoid damage and thus very costly repairs. This invention places emphasis on providing a durable, compact carrier capable of protectively enclosing all of the bicycle parts in a safe condition for easy reassembly.

In this regard, U.S. Pat. No. 4,353,464 discloses a hard plastic carrier for storing and transporting a partially disassembled bicycle. The carrier has two hinged sides and means for locking the sides together in a closed position. The interior of each side is fabricated to have multi-level contours for isolating the disassembled bicycle components from one another. The patent states that the protective carrier accepts and safely stores bicycles of many different sizes.

In U.S. Pat. No. 4,378,883, there is shown a bicycle carrying case with two hinged sides which are configured to accept a partially disassembled bicycle, although the patent states that the sides could be configured to accommodate a fully assembled bicycle. Each of the sides has a corresponding opening therethrough so that the case can be carried on a person's shoulder or on a car rack.

U.S. Pat. No. 3,886,988 discloses a bicycle bag comprising a base and right and left fabric side panels which are attached to the base. Each side panel is provided with a folding flap to isolate the bicycle wheels from the frame. The base includes pivotal supports which are adapted to be received within the head and the seat tubes of the frame to support the frame on the base in an upside-down orientation. Handles are attached to each of the panels to facilitate carrying the bag.

U.S. Pat. Nos. 3,871,546; 4,149,634; and 4,390,088 disclose still other cartons on carriers for transporting and storing bicycles.

SUMMARY OF THE INVENTION

A bicycle carrier for storing and transporting a partially disassembled bicycle is formed of an enclosure with a base section, a left side section, and a right side section. The base section is generally rigid and horizontal, and it is provided with frame-mounting means for detachably mounting the bicycle frame in an upright orientation. The left side section and the right side section are rigid and each has a vertical sidewall. Wheel mounting means are provided on at least one of the vertical sidewalls for detachably mounting at least one bicycle wheel thereon. Means are provided also for detachably and pivotably connecting each of the side sections to the base section.

Preferably, the frame-mounting means includes a forward frame-engaging means for engaging the front fork of the bicycle, and a rear frame-engaging means for engaging the rear fork of the bicycle frame. One of the frame-engaging means is mounted on a swinging member which is pivotably mounted on the base section to thereby permit different spacings between the forward and rear frame-engaging means. The swinging means may comprise a swing plate which supports the rear frame-engaging means and is pivotably mounted on the base section of the enclosure. A forward frame-engaging means may include a support means for receiving the bifurcated lower tip portions of a bicycle fork, and means for holding the bifurcated tip portions on the support means.

The means for connecting each of the side sections to the base section preferably includes interengageable male and female elements which are mounted on different sections to provide a releasable hinge means.

The base section may have a recess adapted for receiving a sprocket portion on a bicycle frame. According to another feature of the invention, casters are mounted on the base section, and a handle is mounted on a side section of the enclosure.

With respect to the bicycle wheels, the carrier is provided with spacer means which protrude inwardly from the vertical sidewall of at least one of the side sections in order to contact portions of a bicycle wheel. Preferably, there are two raised spacers which extend diagonally across the vertical sidewall. The spacers have their minimum heights in the central area of the sidewall and their maximum heights in the perimetral area of the sidewall. Two wheels are mounted on the side wall, and each of these wheels lies in contact with both of the spacers in the perimetral area. A first wheel contacts both spacers in the central area, and the second wheel overlaps the first wheel in the central area. Preferably, two such spacers are located on each of the side sections of the enclosure. The wheel mounting means may include straps, while the spacers may be provided with rubber liners for contacting the bicycle wheels.

Although the invention may take many diverse forms, a preferred embodiment is shown in the accompanying drawings and described in the following detailed description.

BRIEF DESCRIPTION OF THE DRAWINGS

These and other aspects of the present invention are more apparent from the following detailed description and claims, particularly when considered in conjunction with the accompanying drawings in which like parts bear like reference numerals.

FIG. 2 is a perspective view of the bicycle storing and transporting carrier of FIG. 1 in its fully assembled form to provide a portable enclosure for the bicycle;

FIG. 3 is a partially cut-away view of a hinge which connects the base and side sections of the carrier;

FIG. 4 is a front elevational view of the storing and transport carrier of FIG. 1 in its open position; and FIG. 5 is an enlarged perspective view of the rear portion of the base section.

DETAILED DESCRIPTION OF A PREFERRED EMBODIMENT OF THE INVENTION

Figure 1:
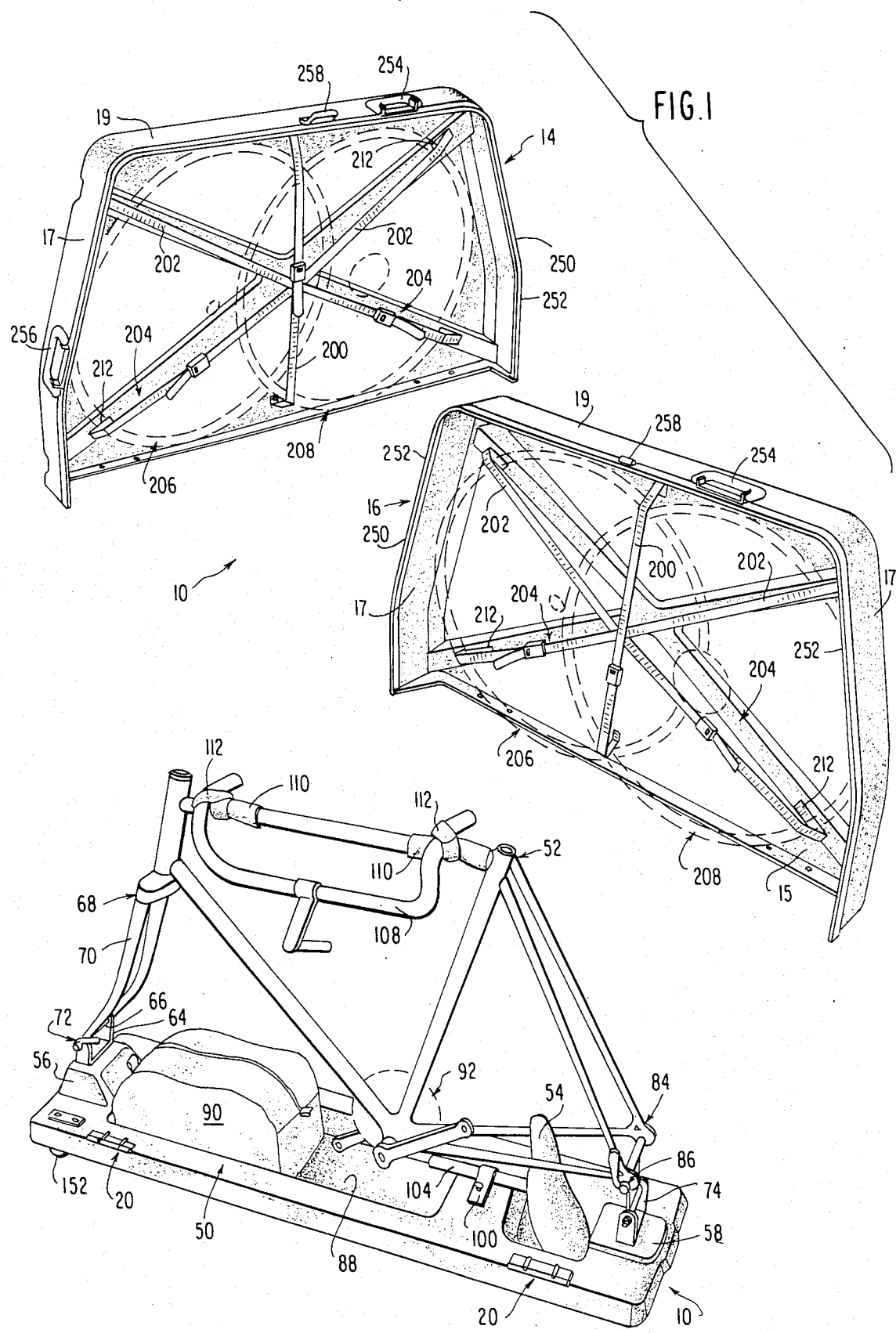
FIG. 1 is an exploded perspective view of the bicycle storage and transportation carrier in accordance with a preferred embodiment of the present invention.

FIG. 1 shows a preferred embodiment of a bicycle shipping and storage carrier 10 in accordance with the present invention. In FIG. 1, carrier is shown in its disassembled form to comprise a generally horizontal, rectangular base section and left and right side sections 14 and 16, respectively. Each of the side sections 14 and 16 has a generally trapezoidal vertical sidewall 15, two generally vertical end walls 17 and a top wall 19. Base section 12 and each of side sections 14 and 16 preferably are constructed from molded fiberglass material to provide a rigid crush-proof and substantially moistureproof enclosure for transporting and/or storing a bicycle. Where sections 12, 14 and 16 are constructed from fiberglass, carrier 10 offers the additional advantage that it will be resistant to discoloration and stains, and it can be cleaned easily with available fiberglass cleansers such as tub or shower stall cleansers.

Carrier 10 is equipped with several quick-release hinge means 18 for connecting the side sections 14 and 16 to the base 12 to form the completed enclosure shown in FIG. 2. With reference to FIGS. 2 and 3, each quick-release hinge means 18 comprises two separable elements so that sections 12, 14 and 16 in turn are physically separable from one another as depicted in FIG. 1. A first or male element 20 of quick-release hinge means 18 is shown to include a mounting plate 22 which is permanently secured to base section 12 in any conventional manner and a tubular portion or body 24 affixed to the mounting plate. Tubular body 24 has two spaced-apart, longitudinally extending slots 26, each of which terminates inwardly in a circumferential slot 28. The tubular portion or body 24 thus has a central section 30 between two end sections 32A and 32B. Central section 30 contains an axially oriented spring 34 for outwardly biasing a pair of plungers 36A and 36B located adjacent to the spring. In FIG. 3, the plunger 36A is retracted within its respective end section 32A while the other plunger 36B is protruding from its respective end section 32B. Hand knobs 38A and 38B extend outwardly in the radial direction from each of plungers 36A and 36B. In their release position, knobs 38A and 38B ride freely in longitudinal slots 26 so that the plungers 36A and 36B are forced axially outwardly by spring 34 into female end sections 40A and 40B of the second or female element 42. Female elements 42 in turn are permanently mounted to the underside of each of side sections 14 and 16. With each of plungers 36A and 36B received within their respective female end portions 40A and 40B, elements 20 and 42 interlock. This engages the quick-release hinge means 18. So engaged, hinge means 18 operates in a conventional manner so that side sections 14 and 16 may swing open about pivot axes on each side of base section 12 as shown in FIG. 4.

Elements 20 and 42 are disengaged for separating side sections 14 and 16 from base section 12 by manually retracting knobs 38A and 38B and plungers 36A and 36B against the bias of spring 34. Once plungers 36A and 36B are manually retracted, they are secured in their retracted positions by moving the knobs 38A and 38B into the circumferential slots 28. When reconnecting the hinges, the plungers 36A and 36B are initially retracted, the end sections 32A, 32B, 40A and 40B are manipulated into axial alignment, and the plungers 36A and 36B are then released. This engages the quick-release hinge means 18 and thereby hingedly connects side sections 14 and 16 to base section 12.

The base section 12 in FIGS. 1 and 5 has an upper surface 50 for accommodating the bicycle frame 52, seat 54 and removable parts such as the pedals (not shown). Upper surface 50 has forward and rear raised portions or shoulders 56 and 58. A first or forward U-shaped member 64 is secured to the top of shoulder 56. Forward U-shaped member 64 and a stationary transverse axle-like rod 66 provide means for releasably mounting front fork portion 68 of the bicycle frame on the base. As is commonly known, there is a slotted lower end on each tubular member 70 of the fork 68. These slotted ends are referred to in this specification as bifurcated tip portions. The slots receive the front wheel axle when the bicycle is assembled, ready for riding. Axle-like rod 66 has a diameter substantially equal to the standard axle diameter so that the rod can likewise be received by the slots in the lower ends of the fork. U-shaped member 64 provides spacing between rod 66 and forward raised shoulder 56 to permit the rod 66 to be fully received by the slots in the fork. Thus, to secure the front fork portion 68 to the base section 12, the bifurcations of the tip portions are aligned with rod 66 and then the front fork portion is lowered onto the rod until the rod is received within the bifurcations. A quick-release mechanism 72, similar to the mechanisms commonly used to fasten bicycle wheels to the forks, provides means for tightening the tip portions against the U-shaped member 64 to secure the front fork 68 to the forward end of base section 12.

A conventional quick-release mechanism has a lever nut mounted on one end of a skewer pin (not shown) which extends axially through the axle of the bicycle wheel or, in the disclosed carrier, through the axle-like rod 66. A manually turnable adjuster knob is threaded on the opposite end of the skewer. To connect the fork to an axle, the slots in the fork are placed on the axle, the adjuster knob is tightened, and the lever is turned to move the lever nut axially. This produces tension in the skewer pin and, more importantly, it forces the adjuster knob and lever nut toward each other to hold the fork on the axle.

Preferably, a second or rear U-shaped member 74 is mounted on the top of rear raised shoulder 58. As shown in FIG. 5, a swing plate 78 is pivotably connected to the rear U-shaped member 74. This permits swing plate 78 to pivot about a transverse axis of the base section 12. Swing plate 78 likewise has an axle-like rod 80 inserted in its upper end to provide means for supporting the rear portion 84 of bicycle frame 52. The rear portion of the bicycle frame also has a rear fork with bifurcated tip portions, provided with slots, which receive the rear axle of the assembled bicycle. These slots receive axle-like rod 80 to releasably mount rear frame portion 84 on the base section 12. A second quick-release mechanism 86, similar to the mechanism 72 described above, is operable to tighten the bifurcated tip portions onto the upper end of the swing plate 78 to secure the rear portion of the bicycle frame.

While in the preferred embodiment swing plate 78 is provided at the rear of base section 12, it is understood that the swing plate could be located at the forward end of the base section. Further still, where the frame of a particular bicycle has the same length as the spacing between U-shaped members 64 and 74, swing plate 78 could be omitted whereupon the rear frame portion would be secured directly to another rod journalled in the rear U-shaped member.

Base section 12 and carrier 10 thus are made to accommodate the frames of all standard racing and touring bicycles in an upright, substantially level position on the base section. In particular, the pivotal movement of swing plate 78 allows adjustment of base section 12 for bicycle frames of different sizes, particularly frames having different spacing between their front and rear frame portions 68 and 84. Since each of the axle-like rods 66 and 80 are respectively received within the slots in the front and rear bifurcated tip portions of the bicycle frame, in the same way that the wheel axles are held therein, base section 12 supports the frame in an upright manner. Preferably, forward shoulder 56 and forward U-shaped member 64 and rear shoulder 58, rear U-shaped member 74 and swing plate 78 are arranged to support the forward and rear frame portions 68 and 84 at approximately the same height. The U-shaped members 64 and 74 are preferably identical for convenience in manufacturing, and forward shoulder 56 is higher than the rear shoulder 58 to account for the height attributed to swing plate 78. Thus, the frame is mounted in an upright, approximately level position on base section 12. So mounted on base section 12, the bicycle frame is easily dismounted from the base by simply loosening the quick-release mechanisms 72 and 86 and lifting the frame off of rods 66 and 80. Remounting of frame 52 upon base section 12 is performed just as quickly by aligning the bifurcated tip portions over rods 66 and 80, lowering the frame whereby the rods are received within the bifurcations and then engaging the quick-release mechanisms 72 and 86. While it is seen as advantageous for the purposes of diassembling and reassembling the bicycle to support frame 52 in an upright, level position, those of ordinary skill in the art appreciate that it is not essential that the frame be supported in a level position.

In addition to shoulders 56 and 58 defining upper level contours for base section 12, base section upper surface 50 is further contoured to have a rectangular recess or well 88. Well 88 is proportioned to admit the sprocket portion 92 of the bicycle frame as well as to receive a utility bag 90. Preferably, bag 90 is disposed in the front of well 88 while the rear of the well accommodates sprocket portion 92. Well 88 should have sufficient rearward extension to accommodate the sprocket portions of bicycle frames which require rearward pivoting of swing plate 78 in order to mount them upon base portion 12. The depth of well 88 depends upon the height of shoulders 56 and 58 and U-shaped members 64 and 74 and should provide clearance between sprocket portion 92 and upper surface 50. These parameters can be varied as understood by one of ordinary skill in the subject art.

As best seen in FIG. 5, the well 88 is connected to another smaller, generally rectangular well 94 by a connecting passageway 96. Connecting passageway 96 is defined by an upstanding portion 98. A cantilevered, hold-down member 100 is mounted on upstanding portion 98 and positioned so that its free end extends over a groove 102 in the upstanding portion. With reference now to FIG. 1, base section 12 is thereby configured also to accommodate the bicycle seat 54 and the seat support post 104. Well 94 receives one end of seat 54 and groove 102 accommodates seat post 104. Thumbscrew 106 is provided for tightening cantilevered member 100 over the seat post 104 to secure the seat to base section 12.

Utility bag 90 is of the zipper-equipped pouch type and thus provides closable means for containing various detachable parts of the bicycle and other accessories. For this reason, the utility bag 90 should have capacity for storing articles such as the bicycle pedals (not shown), a water bottle, various tools, rags or the like and various accessories for carrier 10 as will be discussed below. Preferably, the bag 90 is permanently secured to the base section 12 at the position shown, however, bag 90 may be releasably secured within well 88 by means such as VELCRO hook and loop fasteners or the like. Alternatively, utility bag 90 might simply be placed in well 88, in the position shown, without means for securing it therein.

As also seen in FIG. 1, the bicycle handlebars 108 are supported from the bicycle frame 52 by a combination of protective wraps 110 and tie-straps 112. The protective wraps 110 are wound about that portion of frame 52 from which handlebars 108 are to be suspended in order to protect the finish of the frame. The tie-straps 112 are applied about handlebars 108 and the frame 52, over wraps 110, to secure the handlebars thereon. Preferably, both wraps 110 and tie-straps 112 comprise VELCRO fasteners for purpose of attachment. Alternatively, protective wraps 110 and tie-straps 112 could comprise any conventional means for conveniently securing handlebars 108 to prevent them from moving freely within carrier 10. When not in use, wraps 110 and tie-straps 112 are conveniently stored in utility bag 90.

Preferably, caster wheels 152 are mounted on one or both ends of base section 12 to provide means for permitting towing of carrier 10. If casters 152 are provided at only one end of base section 12, the carrier 10 will not roll unless the front end is lifted for towing as shown in FIG. 2.

As shown in FIG. 1, one vertical strap 200 and two diagonal straps 202 are provided to hold two bicycle wheels on the interior wall of each side section. In order to space the wheels from the vertical sidewalls 15 of the side portions of the enclosure, two ribs or spacers 204 which extend diagonally across the vertical sidewalls 15 of both side sections of the enclosure are provided. Ribs 204 protrude inwardly from the vertical sidewalls 15 to contact relatively small portions of the bicycle wheels. The ribs are tapered from a maximum height in the perimetral area of sidewall 15 to a minimum height in the central area of the sidewall.

On each side section 14 and 16, the wheels are positioned so that both wheels contact the ribs in the perimetral area. In the central area of the sidewall, only one wheel, preferably front wheel 206, contacts diagonal ribs 204, whereas the other wheel, preferably rear wheel 208, partially overlaps front wheel 206.

The interior of sidewall 15 has an indentation which accommodates the axle of the front wheel. The exterior surface of this indentation can be seen at 210 in FIG. 2.

To mount the bicycle wheels in either of side sections 14 or 16, the front wheel 206 is first situated so that its axle is aligned with the indentation and its rim and tire contact the ribs at four places, two in the perimetral area of the sidewall and two in the central area of the sidewall. Preferably, rubber linings or pads 212 are provided on ribs 204 at the four contact areas. Ribs 204 elevate wheel 206 with respect to the interior surface of the carrier.

At two places in the perimetral area of the sidewall, rear wheel 208 contacts the ribs 204. Opposite its contacts with ribs 204, the rear wheel 208 overlies portions of front wheel 206. Protective mats may be provided to physically separate the front and rear wheels where they overlap.

Each of the side sections 14 and 16 has a length which is substantially equal to that of base section 12. Preferably, the length of each of the sections 12, 14 and 16 is slightly greater than three times the radius of the bicycle wheels but less than four times such radius. In this way, carrier 10 is adapted to carry compactly two complete sets of bicycle wheels without a significant increase in its size. Accordingly, the bicycle can be transported with two sets of identical wheels wherein one set is a spare set in case of damage or wear to the primary set. Alternatively, the carrier 10 provides the rider with the capability for transporting two different types of wheels, such as wheels of different thicknesses, so that the rider is prepared for biking in different terrains.

The heights of the side sections 14 and 16 are slightly greater than the diameter of the wheels, and the width or depth of each side section as measured from the free edges 250 of top wall 19 and end walls 17 to the lower level surface provided by vertical sidewall 15, should be approximately three times the length of the bicycle wheel axles, i.e. the width of the wheels. Base section 12 of course is twice as wide as the side sections. The diagonal ribs 204 should have an elevation which provides spacing between the axles of the wheels and the interior of sidewall 15 on the one hand and between the axles and the bicycle frame 52, mounted to base section 12, on the other when carrier 10 is closed. According to the preferred embodiment, carrier 10 is thus compact while it provides means for carrying two separate sets of wheels for the bicycle frame as well as other necessary parts and/or tools required for competitive riding.

Diagonally extending straps 202, securable to diagonally extending ribs or spacers 204, hold the overlapping wheels 206 and 208 against linings 212. The pressure exerted by straps 202 holds the wheels as well as wheel-separating or protective mats, if provided, in place. The third, vertically oriented strap 200 presses rear wheel 208 against front wheel 206 and thereby prevents the overlapping wheels from moving relative to each other. Due to the particular arrangement of each side section and the straps, carrier 10 is able to carry two wheels in each side section. Accordingly, if only one set of wheels is to be placed in carrier 10, both wheels should be strapped to either side section 14 or 16. Also, as is apparent to one of ordinary skill in the art, other arrangements of straps or like securing means could be substituted for the straps shown in and discussed with respect to FIG. 1.

Up to now, carrier 10 has been described as comprising left and right side sections which are molded with interior, diagonally extending flange portions adapting each side section to carry a full set of bicycle wheels. Those of ordinary skill in the subject art, however, appreciate that each side section could just as easily be adapted to mount a single wheel. According to such an arrangement, the vertical sidewall of each side section could be provided simply with elevating or spacing means for spacing each wheel from the interior of the sidewall. Such elevating means could be similar to ribs or spacers 204 or could comprise other suitable means.

In the preferred carrier 10, mating strips 252 are provided on the free edges 250 of end walls 17 and top walls 19 for weather tight sealing between the side sections 14 and 16. Strips 252 provide a tongue and slot fit between the sections 14 and 16 to prevent moisture from entering the carrier 10 when it is closed.

As is also seen from FIGS. 1, 2 and 4, side sections 14 and 16 include handles and a locking latch. Handles 254 are mounted on the top walls 19 of each of sections 14 and 16 to permit lifting and carrying of the carrier 10. Another handle 256, positioned for towing of carrier 10, is attached to an end wall of side section 14. Handles 254 and 256 of course can be attached at other locations on carrier 10. Top walls 19 also have a hand release latch 258 to lock the side sections 14 and 16 together when the carrier 10 is closed.

The disclosed carrier 10 thus provides an ideal enclosure for protectively storing and transporting all conventional racing, sports or touring bicycles. Base section 12, equipped with swing plate 78, accommodates the bicycle frames in an upright, substantially level position to facilitate mounting and dismounting the frame with respect to the base section. Wells 88 and 94, respectively, accommodate the sprocket portion of the frame, and the bicycle seat as well as a bag 90 for containing pedals, small tools or other accessories. Each of the preferred side sections 14 and 16 is configured to carry a set or pair of bicycle wheels to provide the rider with two complete sets of wheels. Quickly releasable straps 200 and 202 securely hold the wheels within side sections 14 and 16. Further, carrier 10 is adapted simply to "fold" open due to a hinged attachment of side sections 14 and 16 to base section 12. Alternatively, hinge means 18 provides capability for completely detaching each of the side sections 14 and 16 from base section 12.

Although the present invention has been described with reference to a preferred embodiment, numerous modifications, rearrangements, and substitutions could be made, and the result would remain well within the scope of the invention.

What is claimed is:

1. A bicycle carrier for storing and transporting a partially disassembled bicycle with its wheels disconnected from its frame, said frame having a front fork portion, a rear end portion and a sprocket portion, said carrier comprising:

an enclosure which includes a base section, a left side section, and a right side section;

said base section being generally rigid and horizontal;

frame-mounting means on the base section for detachably mounting the bicycle frame in an upright orientation, the frame-mounting means including a forward frame-engaging means for engaging the front fork portion of the bicycle frame, a rear frame-engaging means for engaging the rear end portion of the bicycle frame, and a swinging means pivotally mounted on the base section and supporting one of said frame-engaging means to permit different spacings between the forward and rear frame-engaging means;

said left side section being rigid and having a vertical sidewall;

said right side section being rigid and having a vertical sidewall;

means for detachably and pivotally connecting each of the side sections to the base section; and wheel-mounting means on at least one of the sidewalls for detachably mounting at least one bicycle wheel thereon.

2. A bicycle carrier as claimed in claim 1, wherein the swinging means comprises a swing plate pivotally mounted on the base section and supporting the rear frame-engaging means.

3. A bicycle carrier as claimed in claim 2, further comprising a forward U-shaped member and a rod mounted thereon for supporting the front fork portion of the bicycle frame on the base section, and a rear U-shaped member for connecting the swing plate to the base section.

4. A bicycle carrier according to claim 1 wherein at least one of the frame-engaging means includes a rod which is provided with a quick release mechanism, said quick release mechanism having a lever means which is movable to exert a force which retains the bicycle frame on the rod.

5. A bicycle carrier as claimed in claim 1, wherein the means for connecting the side sections to the base section comprises releasable hinge means which includes interengageable male and female elements mounted on different said sections.

6. A bicycle carrier as claimed claim 1, further comprising casters mounted on the base section and a handle mounted on at least one of the side sections.

7. A bicycle carrier as claimed in claim 2, further comprising spacer means protruding inwardly from the vertical sidewall of at least one of the side sections for contacting portions of at least one bicycle wheel held thereon.

8. A bicycle carrier for storing and transporting a partially disassembled bicycle which has its wheels disconnected from its frame, said carrier comprising:
an enclosure which includes a base section, a left side section, and a right side section;
said base section being generally rigid and horizontal and having a recess adapted for receiving the sprocket portion of the frame;
frame-mounting means on the base section for detachably mounting the bicycle frame in an upright orientation;
said left side section being rigid and having a vertical sidewall;
said right side sections being rigid and having a vertical sidewall;
means for detachably and pivotally connecting each of the side sections to the base section; and
wheel-mounting means on at least one of the sidewalls for detachably mounting at least one bicycle wheel thereon.

9. A bicycle carrier as claimed in claim 8, further comprising casters mounted on the base section and a handle mounted on at least one of the side sections.

10. A bicycle carrier for storing and transporting a partially disassembled bicycle which has its wheels disconnected from its frame, said carrier comprising:
an enclosure which includes a base section, a left side section, and a right side section;
said base section being generally rigid and horizontal;
frame-mounting means on the base section for detachably mounting the bicycle frame in an upright orientation;
said left side section being rigid and having a vertical sidewall;
said right side section being rigid and having a vertical sidewall;
means for detachably and pivotally connecting each of the side sections to the base section;
spacer means protruding inwardly form the vertical sidewall of at least one of the side sections for contacting portions of first and second bicycle wheels mounted on a said side section, said spacer means being two raised spacers which extend diagonally across the vertical sidewall of one of the side sections, said sidewall having a central area and a perimetral area, said spacers having their minimum heights in the central area and their maximum heights in the perimetral area, each of said wheels contacting two of the spacers in said perimetral area, said first wheel contacting two of the spacers in said central area, said second wheel overlapping said first wheel in the central area; and
wheel-mounting means on at least one of the sidewalls for detachably mounting the bicycle wheels on said spacers.

11. A bicycle carrier as claimed in claim 10, wherein both of the side sections have two said spacers to enable the carrier to carry two sets of bicycle wheels.

12. A bicycle carrier as claimed in claim 11, wherein the wheel mounting means include straps.

13. A bicycle carrier as claimed in claim 12, wherein the spacers are provided with rubber liners for contacting the bicycle wheels.

* * * * *